United States Patent [19]

Kindall

[11] Patent Number: 5,358,541
[45] Date of Patent: Oct. 25, 1994

[54] FOREHEARTH TEMPERATURE CONTROL SYSTEM

[75] Inventor: Glen E. Kindall, Toledo, Ohio

[73] Assignee: The BOC Group, Inc., Murray Hill, N.J.

[21] Appl. No.: 2,250

[22] Filed: Jan. 8, 1993

[51] Int. Cl.$^5$ ............................................. C03B 5/16
[52] U.S. Cl. ............................ 65/29.17; 65/158; 65/162; 65/346; 65/DIG. 13; 65/29.19; 65/29.21; 65/135.1
[58] Field of Search ................. 65/162, 160, 137, 134, 65/135, 158, 29, 337, 346, DIG. 13

[56] References Cited

U.S. PATENT DOCUMENTS

| | | | |
|---|---|---|---|
| 3,582,310 | 6/1971 | Avery et al. | 65/346 |
| 3,600,149 | 8/1971 | Chen et al. | 65/162 |
| 3,915,682 | 10/1975 | Chotin et al. | 65/29 |
| 3,999,972 | 12/1976 | Brax | 65/337 |
| 4,028,083 | 6/1977 | Patznick et al. | 65/29 |
| 4,069,032 | 1/1978 | Brax | 65/337 |
| 4,118,215 | 10/1978 | Brax | 65/134 |
| 4,375,368 | 3/1983 | Stevenson | 65/29 |
| 4,375,369 | 3/1983 | Border et al. | 65/29 |
| 4,375,669 | 3/1983 | Johnson et al. | 364/473 |
| 4,415,349 | 11/1983 | Engstrom et al. | 65/137 |
| 4,494,974 | 1/1985 | Vilk et al. | 65/337 |
| 4,511,385 | 4/1985 | Barkhau et al. | 65/135 |
| 4,515,614 | 5/1985 | Barkhau et al. | 65/29 |
| 4,552,579 | 11/1985 | Blumenfeld et al. | 65/346 |
| 4,622,059 | 11/1986 | Brown | 65/160 |
| 4,655,812 | 4/1987 | Blumenfeld | 65/346 |
| 4,662,927 | 5/1987 | Blumenfeld | 65/162 |
| 4,680,051 | 7/1987 | Blumenfeld et al. | 65/346 |
| 4,705,552 | 11/1987 | Liska et al. | 65/158 |
| 4,737,917 | 4/1988 | Perron | 65/158 |
| 4,738,706 | 4/1988 | Picinelli | 65/162 |
| 4,762,544 | 8/1988 | Davey | 65/162 |

OTHER PUBLICATIONS

Feedforward-Feedback Control of Gas Fired Glass Forehearths, H. Bartlett & A. K. Kochhar, Glass Technology vol. 29 No. 1 Feb. 1988, pp. 35-42.
An Approach to a Complete Forehearth Process Control Model, H. Bartlett, H. H. Bruun & A. K. Kochhar, Glass Technology vol. 29 No. 4 Aug. 1988, pp. 137-143.

Primary Examiner—W. Gary Jones
Assistant Examiner—Steven P. Griffin
Attorney, Agent, or Firm—Willian Brinks Hofer Gilson & Lione

[57] ABSTRACT

A method of controlling the exit glass temperature and the thermal homogeneity of the glass exiting from a glass forehearth having at least two temperature control zones and having in each temperature control zone at least one temperature regulating means responsive to the difference between a set point signal and an actual value signal for each temperature control zone. The temperature control method includes adjusting the set point signal of each temperature control zone as a function of the temperature of the glass entering the glass forehearth and as a function of the temperature of the glass exiting the glass forehearth.

18 Claims, 1 Drawing Sheet

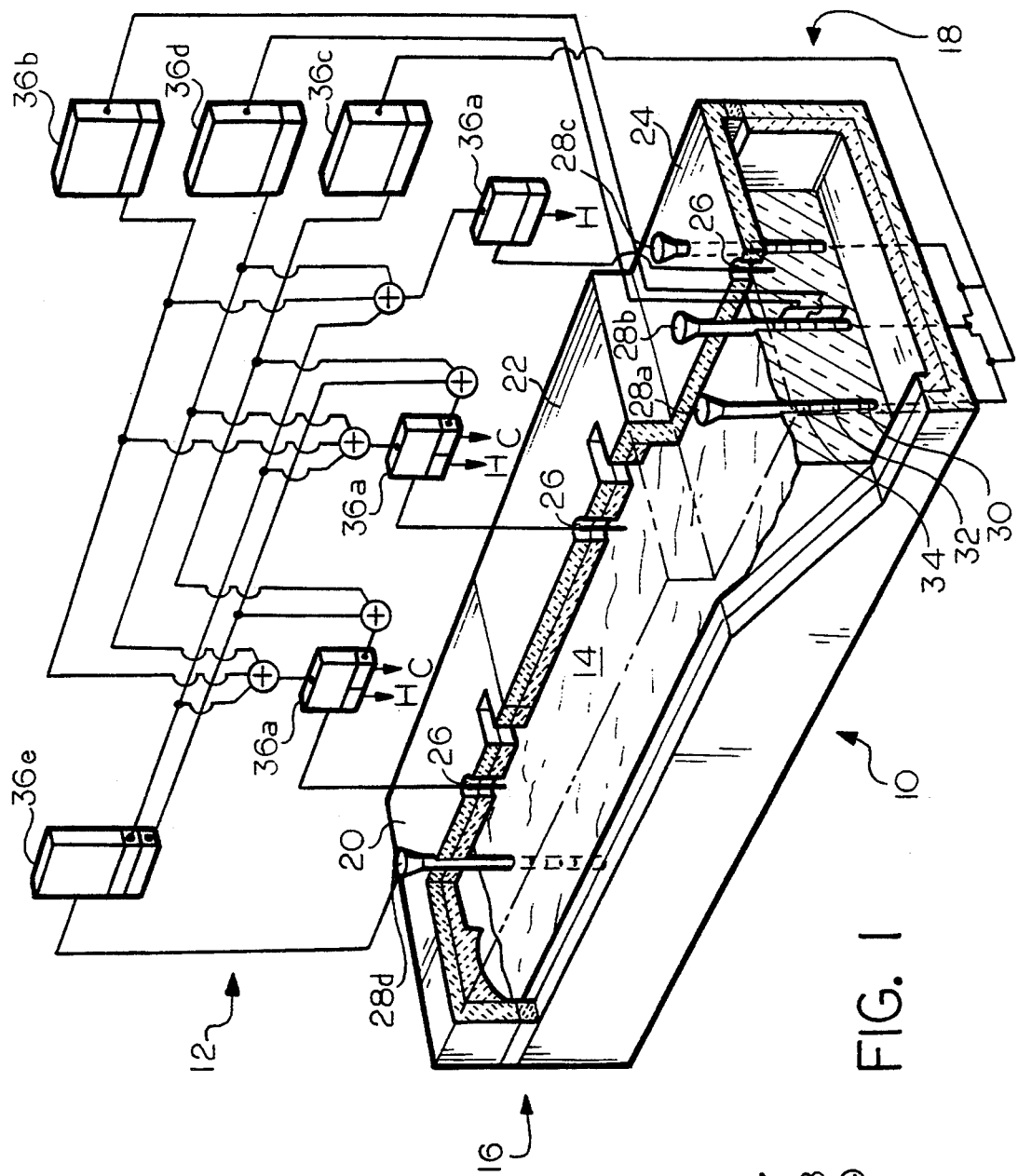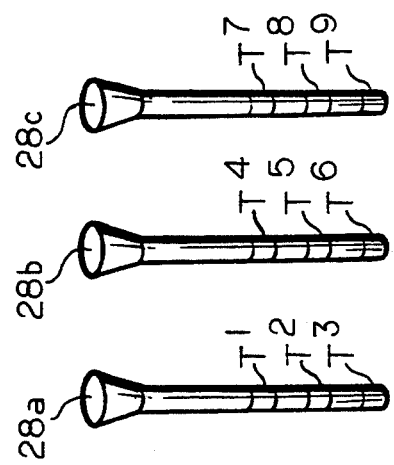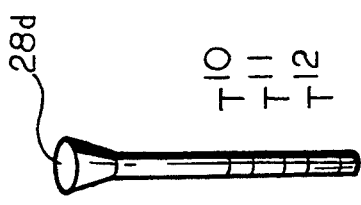

FOREHEARTH TEMPERATURE CONTROL SYSTEM

FIELD OF THE INVENTION

This invention relates to a forehearth temperature control system and a method for controlling the operating temperature within a forehearth. More particularly, this invention relates to a forehearth temperature control system and a method of controlling the glass temperature and the thermal homogeneity of a glass flow exiting from a forehearth.

BACKGROUND OF THE INVENTION

The control system of the present invention is designed to be utilized in a forehearth for thermally conditioning molten glass received from a glass melting furnace and dispensed for subsequent treatment in a glassware forming machine. A glass forehearth typically includes an elongated refractory channel which is divided into a series of sections or temperature control zones for selectively reducing the temperature of the glass and achieving thermal homogeneity to provide a molten glass material of a suitable viscosity for the subsequent forming process. Each temperature control zone of the glass forehearth typically incorporates a plurality of burners, electrodes or other heat input elements spaced along the refractory channel sidewalls to replace heat lost to the refractory channel sidewalls and, in many instances, one or more cooling input elements to selectively remove heat from selected portions of the flowing molten glass.

Problems associated with the operation and control of the forehearth and with the conditioning of molten glass are common due to the limitations inherent in the design of the forehearth and the glass conditioning process. For example, if the forehearth's entrance is near the throat of a melter and the melter is susceptible to upsets due to, frequent tonnage changes, the upsets enter the forehearth almost unchanged thereby affecting the glass exit temperature and thermal homogeneity. Moreover, if the forehearth is pulled harder than designed or if the forehearth is required to remove more heat than designed, the forehearth will be susceptible to external influences such as fluctuations in air temperature and humidity and changing air flow patterns around the forehearth. It will be appreciated that fluctuations in ambient air conditions not only affects the thermal dynamics of the forehearth, but also affects the cooling air which is used as part of the temperature control system.

In addition to external temperature influences on forehearth control, forehearth operation is affected by changes in molten glass level variations and molten glass flow characteristics. During flow of the molten glass in the forehearth the molten glass is naturally cooled on the sides and bottom where heat is conducted through the insulation creating a temperature differential such that those types of molten glass which become more viscous at lower temperatures exhibit an increased flow rate between the top center glass and the side and bottom glass.

It will be appreciated that with the advent of new forming processes such as narrow neck press and blow and light weighting more precise forehearth temperature control is required to achieve and maintain the resultant desired glass production properties.

Accordingly, when operating a forehearth it is an object that the forehearth and forehearth control system maintain the exit glass temperature at a stable temperature and thermal homogeneity regardless of outside influences. In addition to stabilizing the exit glass temperature and thermal homogeneity, it is an object that the forehearth temperature control system correct the exit glass temperature in minimum time and with minimum upset when a new forming temperature is desired. Finally, it is an object that the forehearth control system should facilitate in setting up and stabilizing the forehearth during a job change and bring the exit temperature and thermal homogeneity to the desired values in minimum time and maintain them as the forehearth reaches its new equilibrium point under the new tonnage.

While current control systems have been able to achieve some of the objectives to some degree, current control systems have not been able to achieve most or all of the objectives consistency. In view of the foregoing there is still a need for an improved forehearth control system capable of precise control of forehearth temperature and thermal homogeneity over a plurality of zones with greater economy of design.

SUMMARY OF THE INVENTION

Briefly, according to this invention there is provided a forehearth temperature control system which controls the temperature of molten glass in a plurality of zones including a refractory channel using feedforward control, exit glass temperature control, side to center temperature control and top to bottom temperature control. The principal functional elements in the control loops are temperature sensors associated with each zone, output heating devices having variable heat energy output and associated with respective temperature sensors and a digital computer temperature controller. Optionally, the forehearth may also include one or more variable output cooling devices for selectively cooling the molten glass. The temperature controller of the invention includes a temperature comparing circuit for comparing the outputs of the temperature sensors with corresponding set point signals.

BRIEF DESCRIPTION OF THE DRAWING

Further features and other objects and advantages of this invention will become clear from the following detailed description made with reference to the drawings in which FIG. 1 is a schematic plan view of a glass forehearth with associated temperature control elements;

FIG. 2 is an exploded view of the exit triplex thermocouples of the glass forehearth of FIG. 1; and FIG. 3 is an exploded view of the entrance triplex thermocouple of FIG. 1.

DESCRIPTION OF THE PREFERRED EMBODIMENTS

Referring to the drawing wherein like reference characters represent like elements, FIG. 1 illustrates a glass forehearth 10 including a forehearth temperature control system 12. The glass forehearth 10 is of a type typically used between a glass melting tank or furnace and a feeder bowl. The glass forehearth 10 includes a channel or trough 14 having an entrance 16 and an exit 18. The channel 14 is of a refractory material mounted in a metallic support structure with insulating material positioned between the trough and the support structure.

The channel 14 is divided into a plurality of zones, comprising a first heating/cooling zone 20, one or more intermediate heating/cooling zone(s) 22, and a heating//conditioning zone 24.

The sidewalls of the channel 14 include heat input devices such as gas fired burners or resistance heaters which are spaced along the length of the zones 20, 22 and 24 on both sides of the glass forehearth 10 for heating the glass as the glass flows through the channel. Cooling air from cooling input devices positioned along the top and/or bottom of the forehearth channel 14 may also be provided to cool the glass within the channel. A desired thermal homogeneity and exit glass temperature of the glass exiting from the forehearth channel is achieved with a properly controlled rate of heating and/or cooling.

For purposes of clarity certain details of construction of the glass forehearth 10 are not provided in view of such details being conventional and well within the skill of the art. For example, the heat input devices and cooling input devices are shown generally by the letters "H" and "C" in connection with the controllers of the present invention in view of the placement and operation of the heating and cooling input devices being within the skill of the art once the present invention is disclosed and explained. For a more detailed discussion of the construction and operation of a glass forehearth reference is made to U.S. Pat. Nos. 3,582,310; 3,999,972; 4,069,032; 4,415,349; 4,494,974; 4,511,385; 4,552,579; 4,680,051 and 4,705,552, incorporated herein by reference.

As shown in FIG. 1, the glass forehearth control system 12 includes a temperature sensing system and control system. The temperature sensing system includes an arrangement of prepositioned temperature sensors such as optical pyrometers 26 and/or triplex thermocouples 28 and the like. As shown in FIGS. 1-3, the triplex thermocouples consist of an assemblage of a bottom 30, middle 32 and top 34 thermocouple for sensing the vertical temperature profile of the glass at a fixed location. The output signals from these temperature sensors are received by controllers 36 of the control system which then provide control signals which regulate the operation of the heat input devices H and the cooling input devices C. The controllers 36 must have a minimum input resolution of 0.1° F. to obtain a +/−1° F. temperature control. In addition, the controllers 36 input calibration must be accurate, reliable and repeatable.

The control system of the present invention is designed to achieve thermal homogeneity of the glass exiting from the forehearth 10 as a function of the temperature of the glass at the entrance 16 of the forehearth, the temperature within each zone of the forehearth and as a function of the temperature of the glass flowing from the exit 18 of the forehearth. Accordingly, the present invention provides direct feedback control of the exit glass temperature as measured by a prepositioned arrangement of triplex thermocouples 28a, 28b and 28c located at the exit 18 of the conditioning zone 24 of the forehearth and feedforward control from the entrance glass temperature as measured by a prepositioned entrance triplex thermocouple 28d. In contrast to known control systems, the triplex thermocouple 28d positioned at the entrance 16 of the forehearth 10 allows for the adjustment of the zone set points and the heat/cool settings as required to eliminate the result of glass temperature upsets entering the forehearth which affect the temperature and thermal homogeneity of the glass exiting the forehearth.

The operation of the heating and cooling input devices, generally represented by H and C, respectively, are controlled to optimize forehearth performance. The operation of the heating and cooling input devices, H and C, are determined as a function of the strength of the control signal output from the controllers 36. The control system is organized such that the control system is capable of going from a state of minimum heating whereby cooling occurs (low controller signal output) to a state of minimum cooling whereby heating occurs (high controller signal output). There is an overlap region in which both heating and cooling occur simultaneously in response to the controllers 36. In order to control the side to center temperature in a zone, the zone must be operating in both the heating and cooling state, i.e., in the overlap region.

Generally, the process of the present invention involves sensing the glass temperature along the entire length of the forehearth 10 and then processing the sensed temperatures by comparing the sensed temperatures with predetermined desired glass temperatures, i.e. set points, to operatively adjust the set points and/or activate the heating and/or cooling devices for adjusting the temperature of the glass in the forehearth. It will be appreciated that by sensing and processing the temperature of the glass along the entire forehearth channel 14, the desired temperature and thermal homogeneity of the exiting glass is able to be achieved by gradually modifying the glass temperature as needed rather than compensating at the end of the forehearth channel using boosting or blenders as is known in the art.

More particularly, the control system operates as a function of a zone temperature feedback controller 36a, an exit glass temperature controller 36b, a side to center glass temperature controller 36c, a top to bottom glass temperature controller 36d and a feedforward glass temperature control 36e.

Initially, the control system records the forehearth operating temperature profile at activation of the present invention as a base from which all operating temperature adjustments are made. In addition, the control system records a heat/cool scheme for the optimum heating and cooling levels of a particular forehearth design as a function of the measured zone temperatures and set point temperatures as a base from which all operating heat/cool adjustments are made. It will be appreciated that the heat/cool scheme may be modified and adapted to correspond to a particular forehearth design.

In operation, the temperature of each zone 20, 22, and 24 of the forehearth is determined by a temperature measurement from the optical pyrometers 26 looking at the top glass near the exit of each forehearth zone and along the centerline of the glass flow of the forehearth. The selected measured zone temperature is then compared to a desired predetermined zone temperature to adjust the process control signal output as defined by a standard PID controller function 36a (three-mode controller combining the actions of proportional, integral and derivative elements) to the heating and/or cooling input devices, H and C. The controller output along with the heat/cool scheme operatively adjust the heating and cooling levels. When the control output is high, the heating input device is actuated and the cooling input device is maintained at a minimum. Similarly, when the control output is low, the cooling input device is actuated and the heating input device is maintained at a minimum. When the control output is near approximately 50% the heating and cooling input devices are both actuated.

The exit glass temperature controller 36b adjusts the temperature profile of the entire forehearth using a standard PID feedback controller in order to control the exit glass temperature as a function of the three temperature measurements ($T^4$, $T^5$, $T^6$) from the center exit thermocouple 28b. The exit glass temperature is a weighted average of these three values. For simplicity, the middle junction $T^5$ of the center exit triplex thermocouple 28b may be used as the exit glass temperature.

The output of the exit glass temperature controller 36b is an adjustment which is to be applied to each of the predetermined zone temperature setpoints. The exit temperature controller 36b adjusts the entire forehearth temperature profile in order to control the heating and/or cooling devices, H and C, and the exit glass temperature.

The top to bottom glass temperature is a value derived from the temperature measurements from the three exit thermocouples 28a, 28b and 28c. Two temperature differences are calculated for each of the three thermocouples: the top glass temperature relative to the bottom glass temperature ($T^1-T^3$), ($T^4-T^6$), ($T^7-T^9$) the middle glass temperature relative to the bottom glass temperature ($T^2-T^3$), ($T^5-T^6$), ($T^8-T^9$). A single top to bottom temperature is determined as a weighted average of the six temperature differences.

The top to bottom glass temperature is also controlled using a standard PID feedback controller 36d. The output of this controller 36d is an adjustment which is to be applied to each of the zone setpoints in addition to the adjustment made by the exit temperature controller 36b.

The top to bottom temperature controller 36d also works from the base forehearth temperature profile stored by the control system of the present invention. The top to bottom temperature controller 36d adjusts the forehearth temperature profile by adjusting the exit forehearth zone 24 temperature relative to the first zone 20 temperature. For example, if the top portion of the molten glass needs to be heated, the entrance zone 20 setpoints will be lowered and the exit zone 24 setpoints will be raised. The present invention is devised so that the top to bottom adjustments will change the top temperature relative to the bottom temperature, but will not affect the average exit temperature.

The side to center glass temperature is a calculated value derived from the temperature measurements from the three exit thermocouples 28a, 28b and 28c. First, six temperature differences are calculated. Three for the left side relative to the center ($T^1-T^4$), ($T^2-T^5$), ($T^3-T^6$) and three for the right side relative to the center ($T^7-T^4$), ($T^8-T^5$), ($T^9-T^6$). These temperature differences are calculated by subtracting each of the six side temperatures from the corresponding center temperature. The side to center temperature is a weighted average of the six temperature differences.

The side to center glass temperature is also controlled by a standard PID feedback controller 36c. The output of this controller 36c is an adjustment which is to be applied to the heat/cool scheme of each zone. By adjusting the heat/cool scheme of each zone within the overlap region, the side temperature can be controlled relative to the centerline temperature by raising the heating and cooling simultaneously. Since the cooling is applied to the centerline glass and the heating is applied to the side glass, the side temperature is raised and the center temperature is lowered.

In addition to the previously described feedback control loops, the present invention utilizes feedforward control. Changes in incoming glass temperature cause the largest upsets in the exit glass temperature. Even though the zone temperature control loops correct for the temperature upsets on the surface of the glass, the temperature upsets below the surface are able to go through the forehearth to the exit. The present invention feedback control loops will correct for these uncorrected temperature upsets, but the initial upset will affect production until the feedback loops have time to correct. Feedforward control is able to make adjustments to the zone setpoints and heat/cool scheme to correct for temperature upsets as the upset passes through the forehearth. This way, most of the upset is corrected before it reaches the exit and the remaining upset that does reach the exit will be corrected by the feedback control loops.

The incoming glass temperature is a calculated value derived from the three temperature measurements ($T^{10}$, $T^{11}$, $T^{12}$) from the entrance thermocouple 28d. The incoming temperature is a weighted average of these three values.

The output from the feedforward controller 36e is an adjustment which is applied to each of the zone setpoints in addition to the adjustments made by the exit temperature controller 36b and the top to bottom temperature controller 36d. The feedforward controller 36e also sends an output signal which is an adjustment applied to each of the zone heat/cool crossovers in addition to the adjustments made by the side to center temperature controller 36c. The amount of adjustment made by the feedforward controller 36e is determined by the entered feedforward gain for each zone. This adjustment for each zone is delayed from the time that the temperature upset enters the forehearth 10 until the time that the upset enters the zone. The output is filtered so that the adjustment is applied to the individual zones 20, 22 and 24 as the upset passes through the zones.

The feedforward controller 36e also works from the base forehearth temperature and crossover profiles stored by the present invention. The feedforward controller adjusts the entire forehearth temperature profile up and down and adjusts the profile shape in order to compensate for the incoming temperature upset. The feedforward gains and delay times are set up so that as much of the temperature upset is corrected before it reaches the forehearth exit 18 as is possible. The feedback controllers 36b, 36c and 36d then make the final adjustment to correct for the uncorrected temperature upsets which do reach the exit 18 of the forehearth 10.

As described above, the individual components of the process control system are conventional in nature. Reference is made to Perry and Chilton, CHEMICAL ENGINEERS' HANDBOOK, 5th Edition, McGraw Hill, N.Y., 1973, and to the process control industry literature generally for detailed descriptions on the various process control apparatus and conditions. It will also be appreciated that there are typically always some process anomalies that may require special attention, for example, non-linear process gains and process dead times may require a specific process control tactic such as gain scheduling. As known in the art, the gain or multiplier is determined based upon the particular forehearth design and forehearth operating properties, e.g. response time of forehearth, glass flow rate, energy balance of forehearth and ability to regulate and maintain temperature.

The present invention will be further clarified by consideration of the following example which is intended to be purely exemplary of the use of the process control system in accordance with the present invention.

A test was conducted on a glass production line 48 inches wide, 24 feet in length, producing approximately 110 tons of glass per day. There were three production lines on the melter and the initial test run was performed on an outside forehearth. Data was collected on incoming and exiting glass temperatures using a commercially available Warren Technical Associates, Hewlett-Packard based single loop forehearth process control system. Results indicated that under normal operating conditions the incoming temperature would change 6-7 degrees fahrenheit over a 24 hour period. During this time variation, a change of 4-5 degrees fahrenheit was seen in the exit glass temperature.

A test was then performed on the same forehearth utilizing the control system of the present invention. A centerline temperature profile of the molten glass entering the forehearth was established using a single triplex thermocouple and a cross sectional temperature profile of the molten glass exiting the forehearth was established using three spaced triplex thermocouple. The centerline temperature profile of the glass entering the forehearth is provided in Table 1 and the cross sectional temperature profile of the glass exiting the forehearth is provided in Table 2.

TABLE 1

| Centerline Temperature Profile (degrees F.) |
| --- |
| 2197 |
| 2168 |
| 2137 |

TABLE 2

| Temperature Profile Forehearth Exit (degrees F.) | | |
| --- | --- | --- |
| 2095 | 2090 | 2091 |
| 2100 | 2113 | 2087 |
| 2086 | 2119 | 2065 |

Based upon the cross-sectional temperature profile of the glass exiting the forehearth an exit centerline temperature average, top to bottom temperature average and side to center temperature average were determined.

The average exit centerline temperature is a weighted average temperature derived from the three temperature measurements from the center exit thermocouple. In this test, the top temperature was multiplied at 0%, the middle junction at 50% and the bottom junction at 50%.

Centerline Temperature Average
(2090 × 0%) + (2113 × 50%) + (2119 × 50%) = 2116

The side to center temperature average is a value derived from subtracting each of the six side temperature measurements from the corresponding center temperatures. The six temperature differences were then averaged and weighted. In this test, the left-top difference was multiplied at 0%, the left-middle difference at 50%, the left-bottom difference at 0%, the right-top at 0%, the right-middle at 50% and the right-bottom at 0%.

| Side To Center Temperature Average |
| --- |
| side thermocouple − center thermocouple |
| 2095 − 2090 = 5    2091 − 2090 = 1 |
| 2100 − 2113 = −13   2087 − 2113 = −26 |
| 2086 − 2119 = −33   2065 − 2119 = −54 |
| average and weighted six temperature differentials |
| (5 × 0%) + (−13 × 50%) + (−33 × 0%) + (1 × 0%) + (−26 × 50%) + (−54 × 0%) = −19.5 |

Similarly, an average weighted centerline entrance temperature was calculated. In this test, the top temperature was multiplied at 33%, the middle temperature at 34% and the bottom temperature at 33%.

Centerline Weighted Average Entrance Temperature
(2197 × 33%) + (2168 × 34%) + (2137 × 33%) = 2167.3

The forehearth operator then entered in the process control system set points for the desired exit glass temperature and the desired average temperature differential for side to center. The top to bottom average temperature differential was not employed. From these entered set points the control system of the present invention automatically adjusted the zone set points and temperature regulating means in the forehearth. Each of the cooling zones was controlled via a standard BH-F heat/cool scheme using an overlap between heating and cooling. The process variable, i.e. zone temperature, was measured using a Fibertemp brand infrared pyrometer from BH-F Systems Inc. and conveyed to the process control system.

Utilizing the same forehearth with the control strategy of the present invention the exit temperature variation was reduced to less than +/−1 degree fahrenheit. In addition, the side to center temperature was reduced to less than +/−2 degrees fahrenheit from setpoint.

To further illustrate the present invention, upsets were also purposefully introduced to test process control stability. In this test, 20 degree fahrenheit fluctuations in glass temperature were observed at the forehearth entrance resulting in less than a 2 degree fahrenheit variation in exit glass temperature utilizing the present invention.

Although the present invention was primarily developed in connection with the 400 series forehearth as provided by BH-F Engineering Inc. it will be readily apparent that the present invention maybe used with equal facility with other glass forehearth systems.

The documents, patents and patent applications referred to herein are hereby incorporated by reference.

Having described presently preferred embodiments of the invention, it is to be understood that it may be otherwise embodied within the scope of the appended claims.

What is claimed is:

1. A method of controlling exit glass temperature and thermal homogeneity of glass exiting from a glass forehearth having at least two temperature control zones and having in each temperature control zone at least one temperature regulating means responsive to the difference between a set point signal and an actual value signal for each temperature control zone, the temperature control method comprising adjusting the set point signal of each temperature control zone as a function of the glass temperature entering the glass forehearth and as a function of the glass temperature exiting the glass forehearth.

2. The method of claim 1 wherein the set point signal of each temperature control zone is adjusted as a function of an average temperature of the glass entering the glass forehearth and as a function of an average temperature of the glass exiting the glass forehearth.

3. The method of claim 2 wherein the average temperature of the glass entering the glass forehearth is a measure of an average of the temperature across a depth of a cross section of the glass.

4. The method of claim 1 wherein the glass temperature is measured in a vertical cross sectional plane of the glass exiting the forehearth and is an overall average of the glass temperature measured between top center portion, middle center portion and bottom center portion of the vertical cross sectional plane.

5. The method of claim 4 wherein the glass temperature is measured in a vertical cross sectional plane of the glass entering the forehearth and is an overall average the glass temperature measured between a top center portion, a middle center portion and a bottom center portion of the vertical cross sectional plane.

6. The method of claim 5 wherein the glass temperature is measured in a vertical cross sectional plane of the glass exiting the forehearth and is an overall average of an average temperature measured between top side portions and a top center portion of the vertical cross sectional plane, between middle side portions and a center portion of the vertical cross sectional plane and between bottom side portions and a middle bottom portion of the vertical cross sectional plane.

7. The method of claim 6 wherein the glass temperature is measured in a vertical cross sectional plane of the glass exiting the forehearth and is an overall average of an average temperature measured between top portions and bottom portions of the vertical cross sectional plane and between middle portions and bottom portions of the vertical cross sectional plane.

8. A method of controlling glass temperature and thermal homogeneity of a glass flow exiting from a forehearth including a plurality of temperature control zones and having in each temperature control zone at least one temperature regulating means responsive to the difference between a set point signal and an actual value signal for each temperature control zone, the temperature control method comprising:
sensing an average temperature of a central portion of glass flow entering the forehearth;
sensing an average temperature of the glass flow exiting the forehearth;
adjusting the set point signal of each temperature control zone and adjusting the temperature regulating means of at least one of the temperature control zones as a function of an average localized temperature of a top center portion, a middle center portion and a bottom center portion of a vertical cross sectional plane of the glass entering the forehearth;
adjusting the set point signal of each temperature control zone as a function of an average of an average temperature measured between top portions and bottom portions and between middle portions and bottom portions of a vertical cross sectional plane of glass exiting the forehearth;
adjusting the temperature regulating means of at least one temperature control zone as a function of an average of an average temperature measured between top side portions and a top center portion, between middle side portions and a middle center portion and between bottom side portions and a middle bottom portion of a vertical cross sectional plane of glass exiting the forehearth;
adjusting the set point signal of each temperature control zone as a function of an average of the temperature measured between a top center portion, a middle center portion and a bottom center portion of a vertical cross sectional plane of the glass exiting the forehearth.

9. The method of claim 8 wherein the set point signal of each temperature control zone is adjusted by combining a feedforward adjustment with an exit temperature feedback adjustment and a top to bottom feedback adjustment and then adjusting the setpoint signal to produce an operating set point within each control zone.

10. The method of claim 9 wherein the temperature regulating means of the temperature control zones is adjusted by combining an entrance heat/cool scheme adjustment and a side to center heat/cool scheme adjustment and then adjusting each zone heat/cool scheme in response to the combined heat/cool scheme adjustment to produce an operating heat/cool scheme.

11. The method of claim 8 wherein the temperature control zones include at least one heating/cooling zone and a heating conditioning zone.

12. The method of claim 11 further comprising the steps of receiving an output signal from temperature sensors by controllers and regulating heating input devices and cooling input devices in response to a control signal from the controllers.

13. The method of claim 12 wherein the controllers operate over a range of low controller signal output whereby minimum heating and maximum cooling occurs to high controller signal output whereby maximum heating and minimum cooling occurs.

14. The method of claim 13 wherein the controllers are PID controllers.

15. A method of controlling exit glass temperature and thermal homogeneity of glass exiting from a glass forehearth having at least two temperature control zones and having in each temperature control zone at least one temperature regulating means responsive to the difference between a set point signal and an actual value signal for each temperature control zone, the temperature control method comprising the steps of:
measuring the temperature of each zone of the forehearth;
comparing the measured temperature of each zone of the forehearth with a predetermined desired temperature for each zone with a PID controller to produce a process signal; and
operatively adjusting heating and cooling levels within each zone in response to the process signal.

16. The method of claim 15 wherein the heating and cooling levels are operatively adjusted by heat input devices and cooling input devices spaced along a length of the glass forehearth responsive to a glass forehearth control system including a temperature sensing system and a temperature control system.

17. The method of claim 16 wherein the controllers operate over a range of low controller signal output whereby minimum heating and maximum cooling occurs to high controller signal output whereby maximum heating and minimum cooling occurs.

18. The method of claim 17 further comprising the steps of sensing an average temperature of a central portion of glass flow entering the forehearth;

sensing an average temperature of the glass flow exiting the forehearth;

adjusting the set point signal of each temperature control zone and adjusting the temperature regulating means of at least two of the temperature control zones as a function of an average localized temperature of a top center portion, a middle center portion and a bottom center portion of a vertical cross sectional plane of the glass entering the forehearth;

adjusting the set point signal of each temperature control zone as a function of an average of an average temperature measured between top portions and bottom portions and between middle portions and bottom portions of a vertical cross sectional plane of glass exiting the forehearth;

adjusting the temperature regulating means of at least one temperature control zone as a function of an average of an average temperature measured between top side portions and a top center portion, between middle side portions and a center portion and between bottom side portions and a middle bottom portion of a vertical cross sectional plane of glass exiting the forehearth; and adjusting the set point signal of each temperature control zone as a function of the average of the temperature measured between a top center portion, a middle center portion and a bottom center portion of a vertical cross sectional plane of the glass exiting the forehearth.

* * * * *